United States Patent [19]
Olashuk et al.

[11] Patent Number: 5,599,395
[45] Date of Patent: Feb. 4, 1997

[54] APPARATUS FOR CONTINUOUS FLAT-ROLLED STEEL STRIP CLEANSING AND FINISHING OPERATIONS

[75] Inventors: Kenneth R. Olashuk, Follansbee; Lester R. Shields, Weirton, both of W. Va.

[73] Assignee: Weirton Steel Corporation, Weirton, W. Va.

[21] Appl. No.: 445,530

[22] Filed: May 23, 1995

[51] Int. Cl.⁶ ........................ B05C 3/00
[52] U.S. Cl. .................. 118/405; 118/623; 118/67; 118/68; 118/610; 118/419; 134/64 R; 134/109
[58] Field of Search .................. 118/58, 67, 68, 118/405, 419, 610, 623, 683; 134/64 R, 109, 10; 266/102, 111–113

[56] References Cited

U.S. PATENT DOCUMENTS

| | | | |
|---|---|---|---|
| 3,871,982 | 3/1975 | Idstein | 134/64 R |
| 4,119,109 | 10/1978 | Lukac et al. | 134/64 R |
| 4,521,455 | 6/1985 | Domokos | 427/178 |
| 4,784,169 | 11/1988 | Striedieck | 134/111 |
| 5,116,447 | 5/1992 | Kimura et al. | 156/345 |
| 5,179,967 | 1/1993 | Mattiussi | 134/60 |

*Primary Examiner*—Jill Warden
*Assistant Examiner*—Harold Y. Pyon
*Attorney, Agent, or Firm*—Shanley & Baker

[57] ABSTRACT

In-line flat-rolled steel cleansing and finishing apparatus is disclosed which enable flat-rolled steel, as supplied with surface areas contaminated with iron fines and other debris from gauge reduction operations, to be continuously processed in-line, free of interruptions for cleansing purposes. Continuous-strip apparatus is disclosed which enable in-line continuous-strip cleansing in a manner which decreases iron fines carried by strip surfaces to a desired level while providing for continuous uniform cleansing. Carry-over of iron fines from the cleansing operations so decreases such that iron content of a coating means is decreased resulting in improved corrosion-protection coating. Diminishing iron content in a hot-dip galvanizing bath increases efficiency of aluminum additions and diminishes iron-aluminum dross.

17 Claims, 6 Drawing Sheets

5,599,395

APPARATUS FOR CONTINUOUS FLAT-ROLLED STEEL STRIP CLEANSING AND FINISHING OPERATIONS

INTRODUCTION

This invention relates to continuous flat-rolled steel strip finishing operations and, more specifically, is concerned with improving corrosion-protective adhesion of finish coatings by improving continuous-surface cleansing methods and apparatus for flat-rolled steel as supplied for finish coating operations.

Flat-rolled steel as provided for corrosion-prevention finishing includes surface contaminants from hot rolling and/or cold rolling gauge reduction operations. Large capacity cleaning solution can be been built into flat-rolled steel strip processing lines in an attempt to extend the time period during which a cleaning solution can be used without interrupting line operations to replace the cleaning solution. However, increased tank capacities increase down time in order to allow for removal of large volumes of spent solution and replacement with new chemically controlled cleaning solution. So-called continuous-strip finishing line operations cannot be "continuous" when it is necessary to stop finishing line operations for removal and replacement of cleaning solution.

SUMMARY OF THE INVENTION

It has been found that changing levels of iron fines in cleaning solutions has detrimental effects on cleansing operations and finish coating operations.

It is an object of the present invention to enable continuous flat-rolled steel strip finishing operations without interruption due to surface cleansing operations.

Objectives of the invention are to increase uniformity of continuous-strip cleansing operations and of finishing operations, and to diminish waste disposal requirements.

Other advantages and contributions of the invention are set forth more specifically with references to the accompanying drawings.

DETAILED DESCRIPTION OF THE INVENTION

Flat-rolled steel, as provided after hot rolling and cold rolling gauge reductions, presents surface contaminants including iron fines and combinations of differing forms of iron oxide. In certain operations, hot rolling mill scale may not be adequately removed before cold rolling and, in addition, the level of iron fines increases during cold rolling gauge reductions. Surface contaminants can also include semi-solid agglomerates when cold rolling lubricants are used, for example in temper rolling operations.

It has been found that iron fines continue to accumulate in large-capacity cleansing tanks notwithstanding continuous mechanical filtering. Other significant operational and finish coating factors are also involved. It has been found that significantly changing and increasing levels of iron fines in cleaning solution are detrimental to uniform strip cleansing and are also detrimental to in-line finish coating. For example, increasing levels of iron fines in an in-line cleaning solution increases the iron fines carried by the strip into an in-line hot-dip galvanizing bath, and the resulting increase in iron content in the galvanizing bath decreases the effectiveness of aluminum additions to the bath.

It has been found that sustained separation of flat-rolled steel surface-area contaminants improves in-line cleansing and improves finishing operations. Finishing operations for flat-rolled steel encompass such operations as hot-dip coating with zinc, zinc alloys, terne metal and the like, metallic electroplating with tin, zinc, nickel-zinc, chrome and chrome oxide, and temporary corrosion prevention coatings, and/or coating with a polymeric material in a solvent, electrolytically, or in a solid laminate or powder form.

Figure 1:
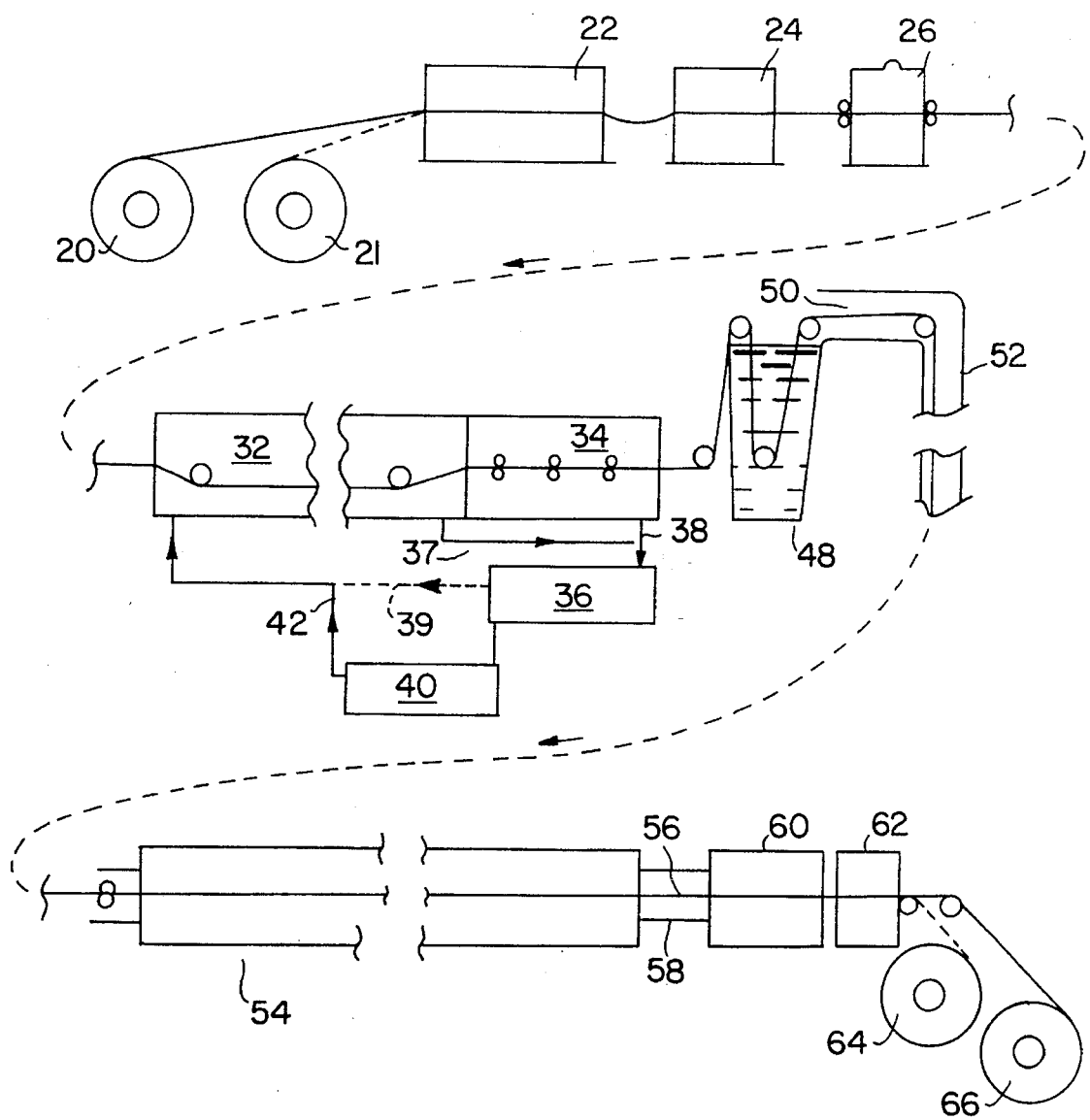
FIG. 1 is a schematic general arrangement for describing continuous flat-rolled steel strip finishing line operations embodying the invention.

Referring to the finishing line embodiment of FIG. 1, flat-rolled steel strip of coils 20, 21 has been produced from cast ingots or slabs by hot processing including hot rolling, during which mill scale and other contaminating debris build up on surface areas. Cold rolling follows, often without sufficient removal of hot rolling mill scale and, further, cold rolling increases iron fines on cold rolled surface areas. Also, when the strip is temper rolled, a rolling lubricant is added such that contaminated strip surface areas can include semi-solid agglomerates.

Leading and trailing edges of the strip are trimmed at 22 (FIG. 1) in preparation for feeding by pinch rolls 24 to welder 26. Use of a looping pit or tower helps in providing continuous-length flat-rolled steel strip for processing free of interruption due to discontinuity in the length of the strip.

In continuous strip galvanizing operations, finishing line operations have had to be interrupted due to strip cleansing operations. Continuous mechanical filtering of large-capacity cleaning solution tanks did not stop the increase in iron fines in such tanks. Iron fines accumulated in such tanks to about five hundred ppm over about a two-week operating period of a continuous strip galvanizing line. And non-uniformity in the continuous steel strip cleansing operation accompanied the increasing buildup of iron fines. Increasing the level of iron fines in a large-capacity tank quantitatively increases iron fines carried by the strip and, thereby, increase iron content of the in-line hot-dip galvanizing bath.

The time loss during interruption of operations, and disposing of large quantities of cleaning solution present serious economic problems. However, the detriment to uniformity of cleansing, non-uniform coating adhesion, and the detriment to roll surfaces used in in-line heat treatment or annealing furnaces for continuous strip present additional problems.

The present teachings, by decreasing the iron fines carried with the strip, facilitate significant decrease in iron content of a hot-dip galvanizing spelter bath, providing increased aluminum efficiency and other advantages.

The present invention (a) provides for increasing uniformity of an in-line strip cleansing operation, (b) eliminates problems of disposal of large volumes of cleaning solution from such large-capacity tanks after relatively short operational periods, (c) eliminates non-uniformity of strip surfaces and finishing operations resulting from the buildup of iron fines in such large tank capacities, (d) diminishes wear on furnace rolls, and (e) significantly decreases the quantity of spent cleaning solution for disposal.

In the embodiment shown schematically in FIG. 1, a main tank 32 provides sufficient hot caustic cleaning solution, and sufficient strip travel distance for dislodging surface contaminants on flat-rolled steel as supplied for a hot-dip galvanizing line. Electrolytic cleaning, or other solutions, can be used in a tank such as 32. In addition, a scrubber shown at 34, can be used in certain finishing line embodiments.

An objective of the invention is to continuously maintain cleaning solution in a main cleansing tank at a desired purity level for iron fines so as to enable maintaining desired uniformity of continuous-cleansing operations; and, also, to eliminate periodic interruption of finishing operations to rapidly dispose of solution from a main cleansing tank, such as 32, and/or from a scrubber 34, if used.

Continuous control of circulation of cleaning solution is preferred. A preselected portion of the cleaning solution from a main cleaning tank is continuous removed; and, a feedback loop is provided for continuous return of cleaning solution after comprehensive and controlled (a) separation, (b) removal, and (c) retention of surface contaminants out of the feedback path.

Continuous mechanical filtering of solid and semi-solid contaminants is preferred. As taught herein, that step is advantageously used to facilitate the desired control of solution withdrawal and feedback. However, special separation means are provided for controlled separation, removal and retention of iron fines and associated debris from the strip cleansing and finishing operations. Configurational features of a special tank which consistently separates, removes, and retains solid and semi-solid contaminants are described in more detail later in relation to FIGS. 2–6.

In the embodiment of FIG. 1, receptor means 36 initiates controlled withdrawal of cleaning solution, with iron fines and associated debris, from a preselected location or locations of cleaning tank 32 and/or scrubber 34. Conduits 37, 38 from such main cleaning tank operation are directed to receptor means 36 in which movement can be implemented by a pumping system. Mechanical filtering means can be included as part of receptor means 36. When mechanical filtering is used, conduit 39 (shown in interrupted lines) returns the filtrate to tank 32 after mechanically filtering contaminating solids and semi-solids.

Then a special separation, removal, and retention structure (described in detail in relation to FIGS. 3–6) functions to keep in-line cleansing and finishing systems free of separated contaminants. Such controlled separation, removal and retention can be operated to eliminate mechanical filtering; but, preferably, is used in combination to provide desired augmentation feedback line 42 from separating structure 40 to complete a solution path from receptor 36, through structure 40, and return to main tank 32.

The contaminant separation, removal, and retention teachings of the invention enable a continuously-operable cleansing system which eliminates any need for periodic change of large volumes of contaminated cleaning solution from a tank such as 32.

In the continuous-strip finishing operations of FIG. 1, a cleaning solution rinse location 48 can be used, and enclosure of strip 50, as indicated at 52, can be provided to minimize surface oxidation while strip 50 is being directed to furnace means 54. The atmosphere of heat treatment furnace 54 is controlled to prevent oxidation of strip surface areas; preferably, furnace 54 is provided with a chemically reducing atmosphere, such as nitrogen and hydrogen.

Strip travel in heat treatment furnace 54 can also be stacked in horizontal layers, or looped vertically in a tower, to provide an extended length steel substrate treatment path of, for example, from several hundred to six hundred feet, or more. The strip is guided and supported by rolls in such furnaces, and treatment temperatures are preselected from about 650° F. to a strip steel annealing temperature which can be above 1,250° F.

From furnace 54, heat treated strip 56 is directed through an atmosphere-controlled chute 58 into a finish-coating operation, schematically represented at 60, which can be selected from a variety of finishing and coating methods. After finishing, various steps, such as leveling the strip or cutting into sheets, which are schematically represented by station 62, can be carried out. In the specific embodiment of FIG. 1, the continuous strip is processed into coils 64, 66 of extended length.

The continuous steel strip cleansing system of the invention includes a special separation means 70 (FIG. 2) for separation, removal, and retention of the iron fines and associated debris. In the flat-rolled steel continuous-strip cleansing embodiment of FIG. 2, contaminated surface areas of strip 72 are treated, generally by at least partial submersion, in a main tank 73 having sufficient capacity to provide desired travel through a hot caustic solution; a scrubber 74 can also be used. Cleaning solution with accompanying contaminants is preferably withdrawn continuously from a preselected location, or locations, and directed through a conduit, such as 75 or 76. Monitoring of iron fines in the main tank is schematically indicated at 77. A continuously-operable mechanical filtering structure 78 is preferably selected to provide for withdrawal of a portion of the capacity of main tank 73 at a controlled rate. Filtrate, from which iron fines and associated debris have been mechanically filtered, is continuously returned from mechanical filtering structure 78 through conduit 80 to main tank 73.

It has been found that continuous mechanical filtering does not stop the buildup of iron fines in large-capacity cleaning solution tanks, such as 73, 74, used in continuous steel strip galvanizing lines.

Purged solid and semi-solid contaminants from mechanical filtering structure 78 are flushed, preferably continuously. Such flushed purge is directed through conduit 82 to separation means which includes tank 70 for continuous separation and retention of solid and semi-solid contaminants. Separation tank 70 is operated to retain such contaminants in a controlled manner so as to diminish iron fines in the solution of main tank 73 and/or so as to maintain a selected and controlled purity level for iron fines in such main tank.

To carry out such functions, tank 70 is fabricated from non-ferromagnetic material which is identified and referred to as paramagnetic. The configurational aspects of separating tank 70 (FIG. 3) and the paramagnetic material make important contributions. Specifically, the paramagnetic material has no effect on magnetic lines of flux. Structural framework can be used for bracing bottom and corner borders of a separating tank, such as 70, provided positioning of the framework is selected so as to be without significant influence on the magnetic lines of flux which act within separating tank 70 as part of the invention.

The paramagnetic material and novel configuration of separating tank 70 (FIGS. 3–6) are selected to provide for extended-area surface treatment of the purge, flushed from mechanical filtering structure, which is carrying iron fines, iron oxides, and/or semi-solid agglomerates. Such iron fines and associated debris are controllably separated and retained in separating tank 70. With such separation and retention, the cleansed solution of separating tank 70 is returned to main cleaning solution tank 73. Improved continuous-strip finishing line operations are provided, and continuous in-line operations need not be interrupted due to strip surface cleansing functions.

A level of iron fines, as selected for main tank 73 (shown and described in relation to FIG. 7), is continuously controlled to a desired low level by the continuously-operable cleansing system and methods taught. And such teachings facilitate decrease in the iron content of an in-line galvanizing bath. The iron content of an in-line hot-dip galvanizing bath for the embodiment of FIG. 1 is controllably decreased, as shown and described in more detail in relation to FIG. 8.

Figure 3:
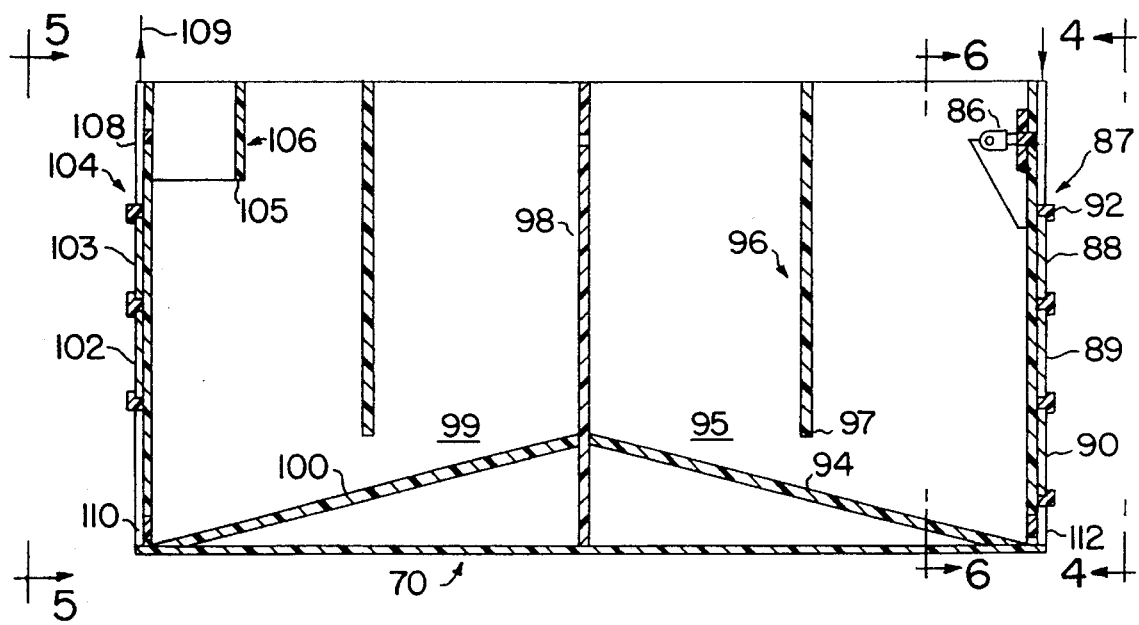
FIG. 3 is a schematic cross-sectional view for describing functions of a particulate separation and retention tank for use in the apparatus of FIG. 2.

Referring to the cross-sectional view of contaminant separating tank 70 of FIG. 3, side walls, endwalls, weirs, a dam site, a froth protector circumscribing the tank outlet, and the canted bottom panels are all formed from a paramagnetic material, such as polypropylene. An optimum capacity for tank 70 is preselected. A volume of about five hundred gallons has been selected for use in a specific embodiment with a five-thousand gallon main tank 73 for a continuous steel strip hot-dip galvanizing line which has an average throughput of steel in the range of about two million square feet of surface area per side per day.

Figure 6:
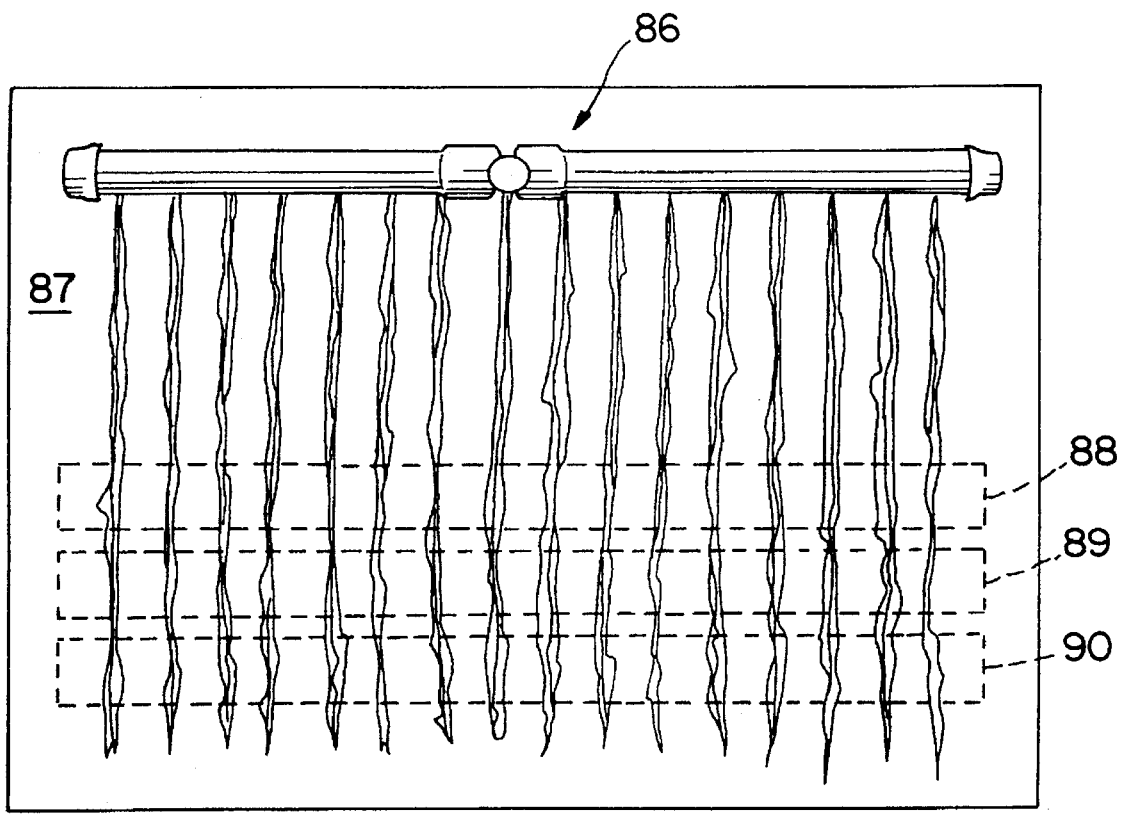
FIG. 6 is a schematic elevational view taken along the line 6—6 of FIG. 3 for describing contaminated solution distribution internally of the separating tank in the area described in relation to FIG. 4.

The purged iron fines and associated debris from mechanical filtration structure 78 are continuously flushed (FIG. 2) and introduced at inlet means 84 of separation tank 70 (FIG. 3) and distributed by conduit 86. Distribution across an inner surface width of endwall panel 87 is best seen in FIG. 6. The cleaning solution flushed purge, with iron fines and associated debris, is directed and controlled in tank 70 to bring about separation and retention of iron fines and such debris.

Magnetic field source means are mounted to be out of direct contact with a caustic cleaning solution.

Figure 4:
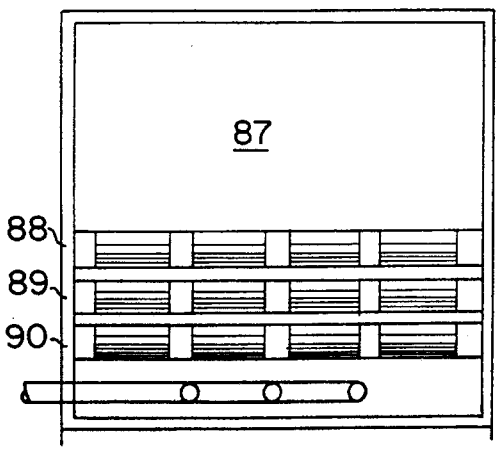
FIG. 4 is a schematic elevational view taken along the line 4—4 of FIG. 3 for describing functioning as contaminated solution enters the separating tank embodiment of FIG. 3.

Preferably, magnetic field source means are mounted at the inlet end 84 of tank 70 on the external surface of endwall 87. Magnetic field sources are mounted in horizontal rows such as 88, 89, 90 (FIGS. 3, 4). A plurality of magnets can be mounted in each row (FIGS. 3–5) across the width of tank 70; or a single magnet extending across the width of the tank can be used in each row (as indicated by FIG. 6). While permanent magnets are preferred, provisions can be made for use of electromagnets. The establishment and positioning of the magnetic field sources, as well as the magnetic force level, are selected. As best seen in FIGS. 3–4, the magnets have been positioned to function from an external surface of endwall 87; magnet holding structure 92 is paramagnetic in order to avoid diminishing the influence on the magnetic field.

The magnetic field extends through the paramagnetic material endwall 87 and is exerted on the interior of the tank 70. Lines of flux are established in substantially parallel relationship to the internal planar surface of endwall 87 across its width, and are established along its height, in the specific embodiment, by preselection of the number of magnet rows. The lines of flux are not affected by the endwall material which is approximately one-inch thick polypropylene. Incoming mechanically-filtered flushed purge, contaminated with iron fines and associated debris, is distributed, as shown in FIG. 6, over an extended surface area while being subjected to lines of magnetic force over such extended surface area. The contaminants in the flushed purge consist essentially of ferromagnetic material, such as iron fines and various iron oxides; other contaminants become associated or agglomerated, for example, by the rolling oils which are not ferromagnetic. Such contaminants are urged by the magnetic field toward an interior surface, for example, endwall 87 where the magnetic sources are mounted. Some contaminants are held directly against that endwall and some are held in suspension in accumulating solution, as described later. Some descend under the influence of gravity toward an area defined between endwall 87 and canted floor panel 94 (FIG. 3) for drainage from tank 70.

Iron fines and associated debris are attracted and held in tank 70. While most purged solids are ferromagnetic, other semi-solid contaminants which are in some way associated with, or agglomerated with, ferromagnetic material are also drawn toward wall 87 and/or toward other surfaces so as to be separated and held in tank 70.

As the liquid rises in space 95 (on the solution entry side of tank 70), solids are also partially retained by the location of weir 96. Accumulating liquid must pass under the lower distal end 97 of weir 96 in order to fill the space 95, established in part by dam 98 and located on the entrance side of the embodiment of tank 70 shown. The ferromagnetic contaminants, which are suspended and held in accumulating liquid in tank 70, appear to attract and hold similar contaminants from the incoming solution. An increase in the magnetic field strength can be selected to increase the extent of magnetic field influence within the tank.

During the time that solution is gathering on the incoming side (space 95), make-up solution can be added to space 99 on the return side of dam 98 if the distribution and/or balance of solution weight, or the forces due to such weight, are required due to the use of paramagnetic materials to form a unitary tank structure (70). In practice, the bracing effect of canted panels 94, 100, and the use of two-inch thick side walls, can provide adequate strengthening of a tank, fabricated to be unitary, from paramagnetic panels using heated plastic welding material which is compatible with the panel material and which is also paramagnetic.

Figure 5:
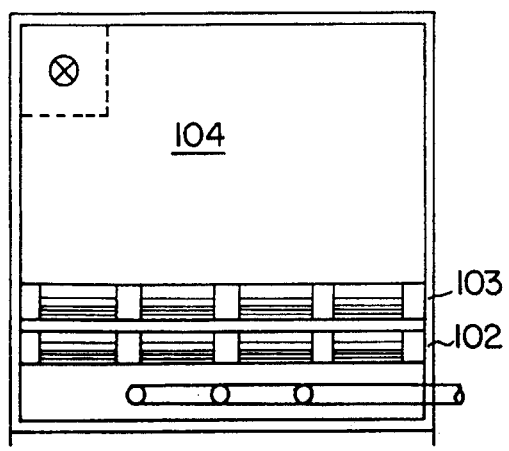
FIG. 5 is a schematic elevational view taken along the line 5—5 of FIG. 3 for describing functioning prior to and upon return of cleansed solution from the separating tank embodiment of FIG. 3.

Incoming flushed purge travels over the interior surface of wall 87 with contaminants being attracted by the magnetic field. Then, solution moves along canted floor 94 under distal end 97 of weir 96 while filling space 95. After passing through openings in dam 98 (or over a dam site if a decreased height dam is used), the liquid directed along canted floor panel 100 is brought under the influence of other magnetic field sources, such as those shown in rows 102 and 103 along return endwall 104 (FIGS. 3 and 5). Remaining contaminants in the liquid (if any), after the earlier separation, settling, and suspension processes, are brought under the influence of magnetic lines of force of the magnetic fields established by the magnets of rows 102, 103.

As cleaning solution level rises in space 99 above the lower distal end 105 of froth detainer 106 (which circumscribes return outlet 108) the return liquid, from which contaminants have been separated and retained, is directed, substantially free of froth, toward main tank 73. Return pumping can be provided, as indicated at 109, for return to main tank 73. Placement of tank 70 in relation to main tank 73 can enable return by gravity; either supply to, or the return from, tank 70 can be augmented by pump means where the physical layout of the line area requires.

The configurational features of separating tank 70, as depicted and described in relation to FIGS. 3–6, provide extended-surface areas for exposure to the magnetic field sources, help to direct solution movement in order to help control separation and retention of iron fines and associated debris, and provide for ease of removal of retained contaminants. The latter, for example, by drainage of compartments 95–99, simultaneously or separately. Cleaning of separated iron fines from tank 70 is facilitated by configurational and operational aspects of separating tank 70. It is to be understood that the number of weirs, dam sites, floor panels, number of magnets, and number of locations for magnets can be increased, along with increases in strength of magnetic fields, to extend the magnetic field influence in relation to the solution movement pattern within separating tank 70.

It has been found that contaminants, as attracted by the lines of magnetic force of the magnets, tend to be suspended in and held in the accumulating liquid. Such suspended contaminants extend a substantial distance toward the center of the tank, which is indicative of the strength of the magnetic field.

Drainage valves 108, 110 (FIG. 3) are positioned so that clearing solution from a compartment of tank 70 by draining also readily clears suspended contaminants. Each compartment can be cleared by vacuum suction or drainage methods, or combinations thereof. When a compartment is drained, contaminants fall under the influence of gravity, as the liquid moves toward the drainage area defined by each endwall and its respective canted floor panel (94, 100). Without intending to be bound, it appears that the lines of magnetic force may be concentrated by the attracted ferromagnetic contaminants, as suspended, and that the latter may help to attract additional contaminants.

Continuous liquid suction clearing of an internal wall can be utilized, or timed intervals can be selected for clearing of individual compartments of separation tank 70. A timed interval can be selected based on empirical results, or dynamic measurements can be utilized during operation of the cleansing system. For example, a desired purity level for iron fines in main tank 73, 74 can be selected; and, based on measurements of iron fines at 77 for the main tank 73 (which includes tank 74 with liquid withdrawal through conduit 76 for incoming flushed purge at 111), and for outgoing feedback (at 112) from separating tank 70, a desired purity level for the cleansing treatment tanks 73, 74 can be established and maintained. The level of iron fines measured at 112 in the feedback line is kept at or below the desired level for tank 73, measured at 77. The effectiveness of the retention in separating tank 70 is determined by a continuing comparison of measurements at 111 and 112.

Selection of a low purity level for iron fines is taught by the invention to maintain significantly improved continuous cleansing and finishing operations. The effectiveness of the present methods and apparatus enables selection of a desired low purity level for iron fines for the feedback solution from separating tank 70. For example, purity levels for feedback solution from separating tank 70 are selected significantly below one hundred ppm for iron fines; selecting a level of about fifty ppm provides a decrease in iron fines by a factor of ten to fifteen times below the five hundred ppm upper level previously considered acceptable for treatment with hot caustic cleaning solution.

For example, the separation tank 70 can be operated to return solution with a purity level of about thirty to forty ppm iron fines to decrease the iron fines to that level in main tank 73. And main tank 73 can be held to such a selected low level, or lower level, indefinitely. The effect of such low level iron fines on iron content of an in-line hot-dip galvanizing bath is a significant contribution of the invention and is discussed in more detail in relation to FIG. 8.

Clearing of one or both interior spaces (95 or 99) of tank 70 can be carried out free of interruption of in-line cleansing or finishing operations. Because of the short time interval involved in drainage of tank 70, several alternatives are provided. As mentioned, each space (95, 99) can be cleared separately or simultaneously. In the specific embodiment of FIGS. 2, 3 the returning filtrate from the mechanical filtering structure 78 can continue along conduit 80, with valves 114,115 (FIG. 2) closed for the short time interval required for draining and flushing both sides of tank 70. The flushed purge from structure 78 can be accumulated at chamber 116, and such accumulation treated after drainage and interior clearing of separating tank 70. Or, flushed purge can be sent to a standby separating tank, or can be sent to a standby separating compartment of tank 70 which has been cleared during the short time required for clearing a remaining compartment. A "T" connection on the inlet line can send flushed purge to either compartment (95, 99) as the other is being cleared.

In general, scheduling clearing of a relatively small-capacity tank 70 can be determined by measuring the level (ppm) of iron fines in the solution from tank 70 in relation to desired low level of iron fines selected and can be maintained in the main cleansing tank as described above. Intervals of about one to two weeks for clearing are satisfactory for clearing when operating at full capacity on a hot-dip galvanizing line cleansing about two million square feet of strip surface per side per day.

In one operational embodiment, both spaces 95, 99 of tank 70 (FIG. 3) can be quickly drained within ten to fifteen minutes. The interior walls of tank 70 are washed using hose-delivered mill water pressure. External mounting of the magnets is preferred in order to provide smooth inner surfaces to facilitated clearing of magnetically-attracted ferromagnetic contaminants. Brushes or brooms can be used to expedite clearing of magnetically-attracted material. Separating tank 70 can be drained and the contaminants washed from its interior walls and bottom panels, with the entire procedure for a five-hundred gallon tank taking from about twenty to about thirty minutes.

The caustic cleaning solution can be gradually replenished as separation tank 70 fills after such a periodic drainage clearing. A selected level for the caustic detergent is maintained in the main tank throughout the cleansing operation.

Processes for draining or otherwise clearing retained iron fines and associated debris from tank 70 can be undertaken periodically, or semi-continuously, to maintain desired separation and retention efficiency within tank 70 so as to maintain substantial uniformity of the desired purity level as selected for iron fines in the solution for the continuous operation of main tank 73, as previously described.

Figure 7:
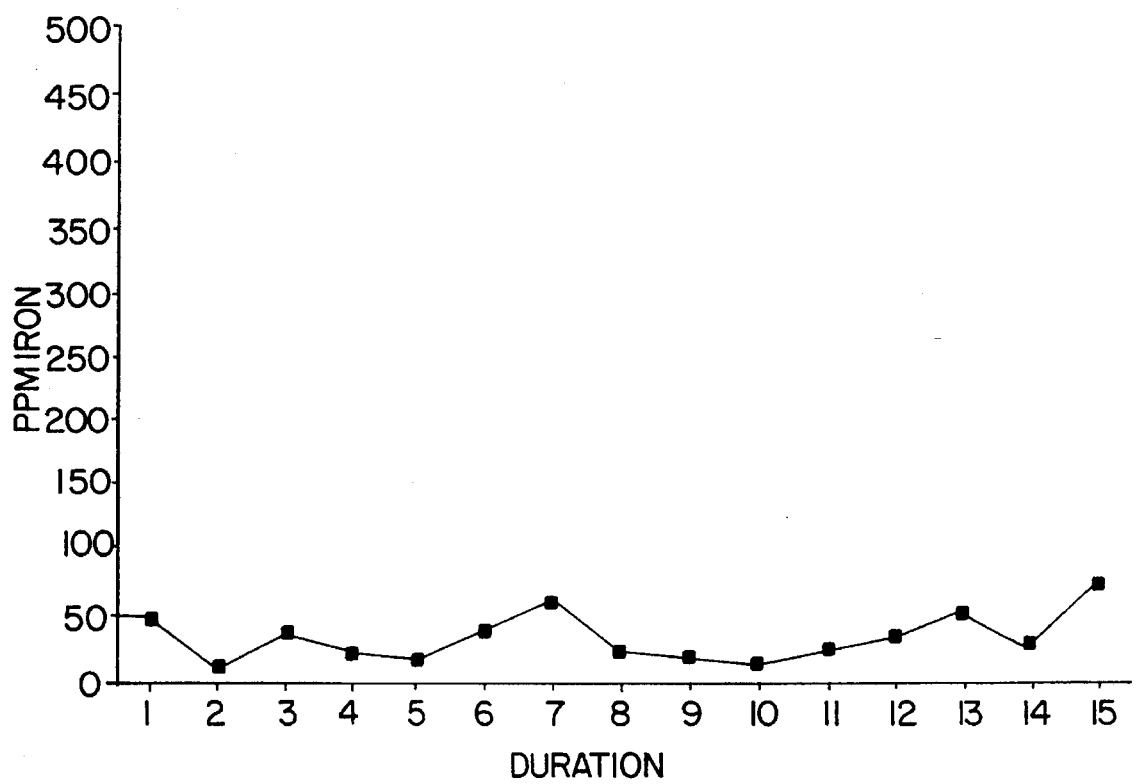
FIG. 7 is a graphical presentation for describing operational results of the invention in removing iron fines.

FIG. 7 graphically shows actual measurement of the purity level of iron fines of main tank 73 during operations in which iron fines have been kept below an average level of about fifty ppm. An extended experimental period at that selected level is now exceeding six months. Practice of the present invention indicates that interruption of finishing line operations, due to strip cleansing operations, will not be required in the foreseeable future.

For purposes of measuring iron fines in ppm, five-thousand gallons of cleaning solution are equal to slightly more than six hundred thousand ounces of solution. The present invention, using six hundred gauss magnets, can maintain a uniformly low level of iron fines of less than about three hundred ounces in such a tank. Such a level constitutes a purity level of less than about fifty ppm in such tank.

The level of iron fines, as indicated in FIG. 7, has been maintained using magnetizing force magnets of about six hundred gauss, supplied by Eriez Magnetics of Erie, Pa. under the designation "Extra Power 600." Added strength magnets extending to about fifteen hundred gauss, and of increased length equal to the width of the separation tank (as schematically indicated in FIG. 6), are being installed for experimental operation and gathering of additional data; such magnets (from the same supplier) are supplied under the designation "Super Power 1500."

The following tabulated data refer to continuous cleansing solution operations for a continuous strip galvanizing line as described above:

TABLE I

| | |
|---|---|
| Main Tank 73 | 5,000 gals. |
| Withdrawn From Tank 73 | About 2,700 ga.l/hr. |
| Centrifugal Filter Apparatus 78 | Lakos In-Line Separator |
| Filtrate from 78 | About 2,300 gal./hr. |
| Separation Tank 70 | 500 gals. |
| Length of Tank 70 | 8 feet |
| Width of Tank 70 | 4 feet |
| Height of Tank 70 | 4.25 feet |
| Flushed Purge to Tank 70 | About 400 gal./hr. |
| Magnet Field Strength | 600 gauss per magnet |
| Number of Magnets Per Row | 4 |
| Total Magnets on Entrance Side Endwall | 12 |
| Total Magnets on Exit Side Endwall | 8 |
| Continuous Galvanizing Line Throughput | 2 million square feet of surface area per side per day |

A suitable continuously-operable centrifugal separator comprises a Lakos In-line Separator manufactured by Lakos Separators U.S.A., 1911 North Helm Avenue, Fresno, Calif. 93727; interval flushing, or continuous flushing of mechanically-filtered purged material is available. Caustic detergent materials can be obtained from suppliers such as Elf Atochem North America, Inc., 2375 State Road, Cornwall Heights, Pa. 19020.

Figure 2:
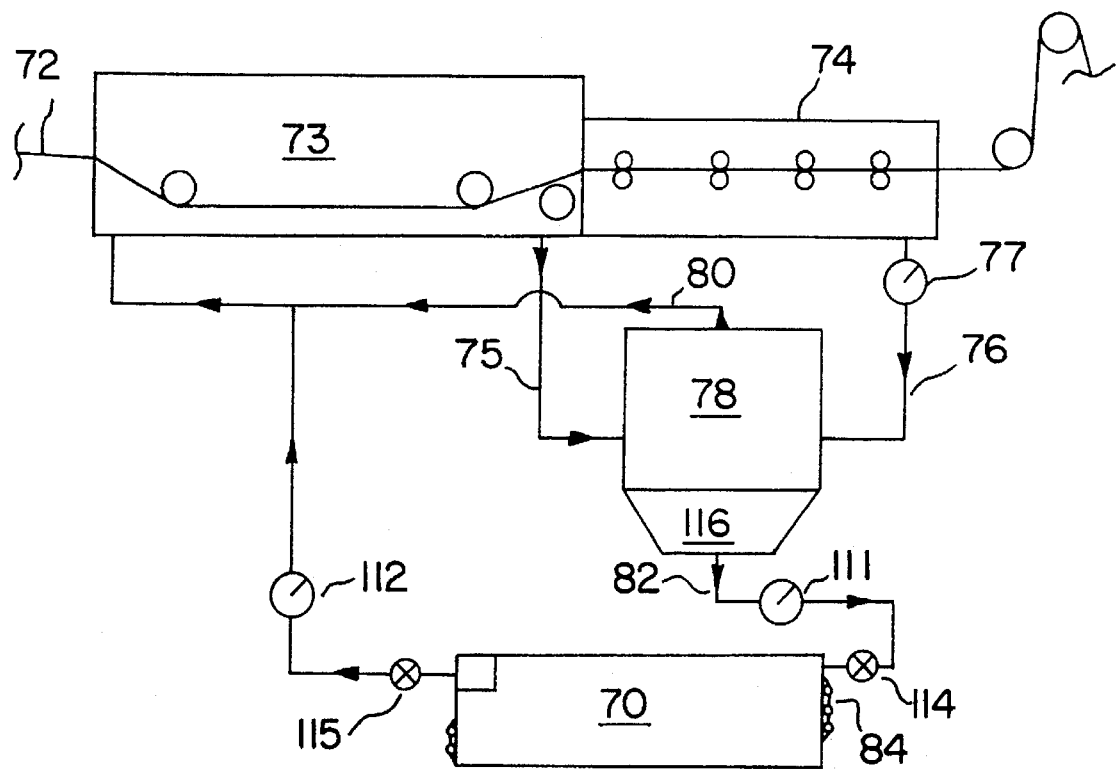
FIG. 2 is a schematic general arrangement for describing a specific continuous flat-rolled steel strip cleansing embodiment of the invention.
Figure 8:
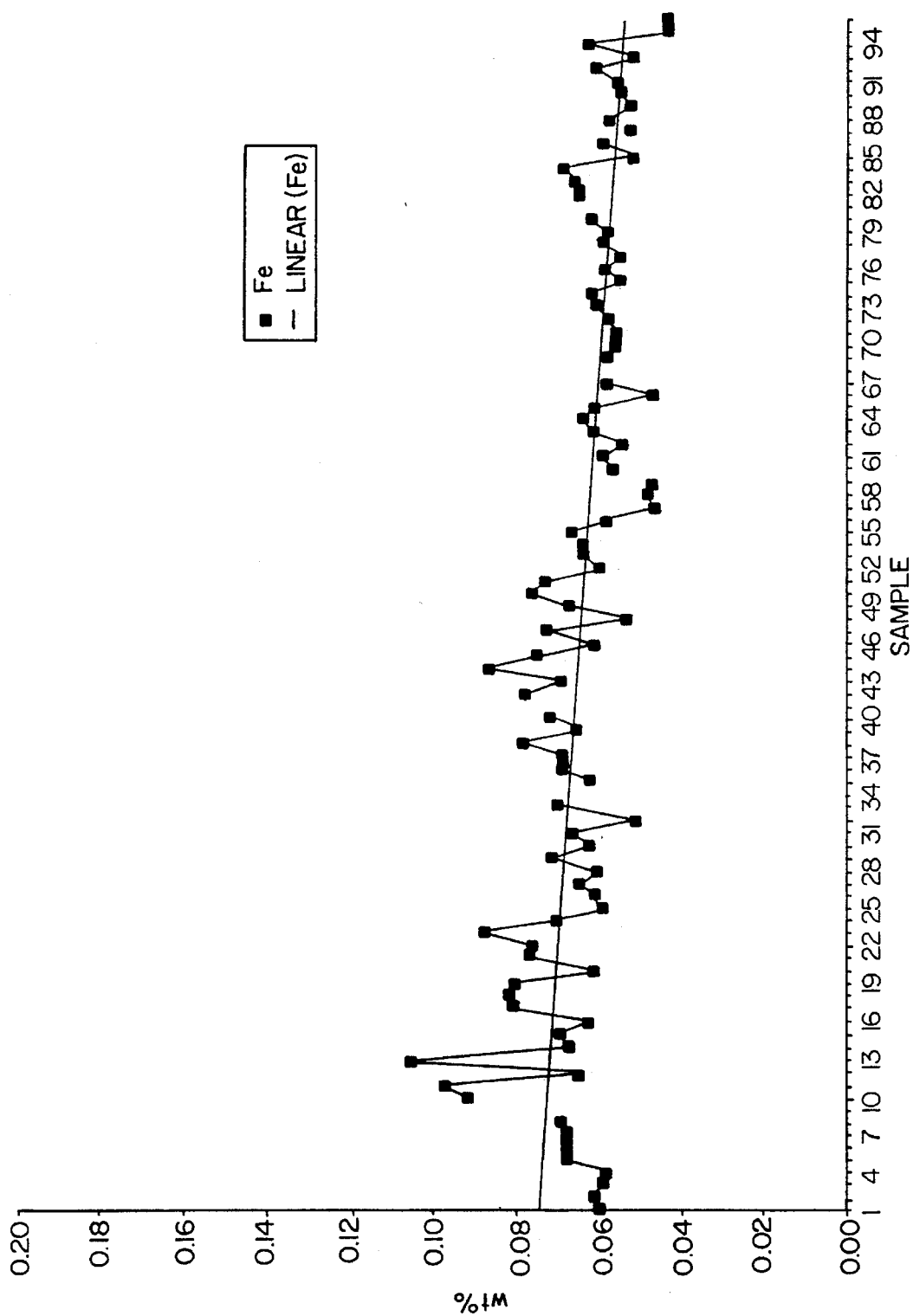
FIG. 8 is a graphical presentation for describing operational results of the invention in decreasing iron content of a hot-dip galvanizing bath.

FIG. 8 shows how the iron content of an in-line hot-dip galvanizing bath has been decreased (from about 0.072% to about 0.057%) based on daily measurements over a period of about three months (94 days) during which iron fines in a main cleaning tank, such as 73 FIG. 2, was maintained at a level as indicated in FIG. 7. Iron content of such galvanizing bath is continuing to decrease, due to the low level of iron fines being introduced into the bath due to strip cleansing operations in accordance with the present invention. As a result of decreasing iron content in the galvanizing bath, the aluminum efficiency increases and iron-aluminum dross decreases.

The iron content of the galvanizing bath is expected to continue to decrease along the solid line indicated in FIG. 8 to a significantly lower level. As iron content decreases, aluminum additions to the bath can be decreased and more standardized, based on the throughput of steel. However, increased aluminum additions will be required when galvanize coating is alloyed with the steel substrate. Such product, in which lightweight galvanized coating is totally alloyed with the substrate steel by increasing the temperature of the steel strip, requires added aluminum.

While specific dimensions, materials and data have been set forth in describing a specific embodiment of the invention, it should be recognized that in light of the teachings presented, others skilled in the art can devise operations which differ from those specifically described without departing from the inventive concepts described; therefore, in determining the scope of the present invention reference shall be had to the appended claims.

We claim:

1. Continuously-operable steel strip finishing line apparatus, comprising

A. means supplying coils of flat-rolled steel strip with flat-rolled surface areas contaminated with iron fines and associated debris, such as produced during gauge reduction, each such coil supplying an extended length of such surface contaminated flat-rolled steel;

B. means for uncoiling such flat-rolled steel coils so as to provide for interconnecting flat-rolled steel from successive coils into a unitary continuous-length flat-rolled steel strip for surface preparation and finishing of surface areas;

C. a continuously-operable strip surface cleansing system for such surface-contaminated flat-rolled steel, including:

(i) a main tank of preselected capacity for holding surface-cleaning solution and means for providing sufficient movement of continuous strip through such main tank sufficient for desired dislodging of iron fines and associated debris from surface areas of such strip, (ii) means for withdrawing a portion of the capacity of such main tank cleaning solution containing dislodged iron fines and associated debris, (iii) means for receiving such portion, including:

(a) a separating tank having a predetermined internal configuration which presents extended-area surfaces fabricated from paramagnetic material, (b) inlet means for receiving such portion with dislodged iron fines and associated debris and distributing internally of the separating tank contiguous to at least one extended-area surface of such paramagnetic material, and (c) magnetic field source means mounted contiguous to such at least one extended-area surface so as to establish lines of magnetic flux, internally of such separating tank, so as to magnetically attract and retain iron fines and associated debris as such portion moves internally of such tank in relation to such at least one extended-area surface, and (d) means for returning solution, from which iron fines and associated debris have been separated and retained, to such main tank for continued in-line use in cleansing flat-rolled steel strip; and D. means for directing such continuous length of flat-rolled steel strip from such cleansing system to subsequent in-line strip finishing means.

2. The apparatus of claim 1, further including furnace means for heat treating the flat-rolled steel strip, located in-line subsequent to such surface cleansing system.

3. The apparatus of claim 1, in which such subsequent in-line strip finishing means includes means for applying corrosion-protection coating to such surface cleansed steel strip with such means being selected from the group consisting of:
 (i) electrolytic metallic plating means,
 (ii) hot-dip metal coating means,
 (iii) means for applying a polymeric coating, and
 (iv) combinations thereof.

4. The apparatus of claim 1, including mechanical filtering means located for functioning between such surface-cleaning main tank and such separating tank.

5. The apparatus of claim 4, in which such mechanical filtering means comprises
 continuously-operable mechanical filtering structure with means for receiving such portion with dislodged iron fines and associated debris continuously from such main tank at a controlled rate, and further including
 means for mechanically filtering iron fines and associated debris from such portion, and
 conduit means for returning filtrate from the continuously-operable mechanical filtering structure to such main tank.

6. The apparatus of claim 5, in which such continuously-operable mechanical filtering structure includes means for continuously purging iron fines and associated debris as mechanically filtered from such withdrawn portion, so as to discharge purging fluid contaminated with mechanically-filtered iron fines and associated debris, and means for directing such contaminated purging fluid to such separating tank inlet means.

7. The apparatus of claim 1 or 6, in which such separating tank is elongated and presents endwall means contiguous to one longitudinal end of the separating tank, and endwall means at the remaining longitudinal end, a centrally-located dam site means, and bottom panel means intermediate such longitudinal ends, such bottom panel means including:
 at least one bottom panel acting with such dam site so as to form at least one solution accumulating compartment on each longitudinal side of such dam, and with
 such at least one bottom panel being canted so as to provide direction for separated iron fines and a gravitational direction for separated iron fines and associated debris from such dam site toward each such longitudinal endwall.

8. The apparatus of claim 7, further including weir means in the separating tank for at least partially controlling movement of liquid within such separating tank between its longitudinal ends, with each of such separating tank configurational structures including such endwall means, side wall means extending between such endwall means, dam site, weir means and bottom panel means being fabricated from paramagnetic material.

9. The apparatus of claim 8, in which the separating tank endwall means, side wall means, dam site means, weir means and bottom panel means are assembled to provide a unitary structure.

10. The structure of claim 1, further including means for monitoring iron fine content of solution in the cleansing system.

11. The apparatus of claim 6, in which such subsequent in-line finishing means comprises continuous strip galvanizing means with a hot-dip galvanizing bath.

12. The structure of claim 11, further including means for monitoring content of iron fines in solution being returned from the separating tank to the main tank so as to quantitatively decrease iron fines capable of being associated with the steel strip as directed from the main tank of such cleansing system toward such in-line hot-dip galvanizing bath, and means for monitoring the hot-dip galvanizing bath to determine quantitative decrease in iron content of such bath resulting from such quantitative decrease in metal fines in the main tank.

13. Continuously-operable surface cleansing apparatus for flat-rolled steel strip which enables continuous finishing line operations of surface cleansed strip, comprising in combination:

A. surface cleansing means including a main treatment tank holding sufficient surface cleaning solution to provide for treatment of contaminated surface areas of such continuous steel strip to dislodge iron fines and associated debris from such surface areas in preparation for subsequent in-line continuous strip finishing operations;

B. means for withdrawing a portion of the main tank cleaning solution, including dislodged iron fines and associated debris, at a controlled rate during continuous cleansing operations.

C. means for directing the withdrawn cleaning solution portion to separating means for separation and retention of iron fines and associated debris, D. such separating means, including
 (i) a separating tank fabricated from paramagnetic material presenting inlet and outlet means which, along with internal surfaces, provide an internal configuration directing movement of such portion within the separating tank, and
 (ii) magnetic field source means disposed to establish lines of magnetic flux selected from the group consisting of a location contiguous to at least one such internal surface and locations contiguous to more than one such internal surface within the separating tank so as to attract and retain iron fines and associated debris internally of the separating tank; and E. means for continuously returning solution from which iron fines and associated debris have been removed and retained from such separating tank outlet means to the main cleaning solution tank for continued use in such surface cleansing system.

14. The apparatus of claim 13, further including means for monitoring iron fines of the solution at the inlet means and outlet means for monitoring iron fines of the separating tank.

15. The apparatus of claim 14, in which magnetic field source means are provided for the separating tank to maintain iron fines in the main tank below a preselected level.

16. The apparatus of claim 13, in which at least two separate compartments are defined, one each on either side of such centrally-located dam site, and means for removing retained iron fines and associated debris from each such compartment are provided to enable selection from the group consisting of removing such debris from each compartment separately and removing such debris from both compartments simultaneously.

17. The apparatus of claim 16, in which the separating tank is elongated with such solution inlet means located at one longitudinal end, and such solution outlet means located at the remaining longitudinal end of the separating tank.

* * * * *